United States Patent
Alei et al.

[11] Patent Number: 5,598,874
[45] Date of Patent: Feb. 4, 1997

[54] LOOM PROCESSING OF HOLLOW FIBER MEMBRANES

[75] Inventors: Philip E. Alei, Oceanside; Jeff C. Schletz, Clayton; John A. Jensvold, Benicia, all of Calif.; Ward E. Tegrotenhuis, Kennewick, Wash.; Wickham Allen, Midland, Mich.; Frederick L. Coan, Antioch, Calif.; Karen L. Skala, Benicia, Calif.; Daniel O. Clark, Pleasanton, Calif.; Harold V. Wait, Jr., Midland, Mich.

[73] Assignee: MG Generon, Inc., Malvern, Pa.

[21] Appl. No.: 514,035

[22] Filed: Aug. 11, 1995

[51] Int. Cl.$^6$ .................................................. D03D 15/00
[52] U.S. Cl. ................ 139/1 R; 139/420 A; 139/426 R; 210/500.23
[58] Field of Search ................ 139/1 R, 426 R, 139/420 A, 383 R; 210/321.79, 321.8, 321.89, 500.23

[56] References Cited

U.S. PATENT DOCUMENTS

| | | |
|---|---|---|
| 4,704,324 | 11/1987 | Davis et al. . |
| 4,758,341 | 7/1988 | Banner . |
| 4,772,392 | 9/1988 | Sanders, Jr. et al. . |
| 4,824,566 | 4/1989 | Thibos . |
| 4,834,877 | 5/1989 | Peters et al. . |
| 4,900,334 | 2/1990 | Admassu et al. . |
| 4,902,416 | 2/1990 | Schroeder et al. . |
| 4,929,259 | 5/1990 | Caskey et al. . |
| 4,961,750 | 10/1990 | Casket et al. . |
| 4,992,485 | 2/1991 | Koo et al. . |
| 5,013,339 | 5/1991 | Mahoney et al. . |
| 5,141,031 | 8/1992 | Baurmeister . |
| 5,163,977 | 11/1992 | Jensvold et al. . |
| 5,202,023 | 4/1993 | Trimmer et al. . |
| 5,211,728 | 5/1993 | Trimmer . |
| 5,212,000 | 5/1993 | Rose et al. . |
| 5,224,522 | 7/1993 | Baurmeister .................... 139/1 R |
| 5,259,903 | 11/1993 | Porta ................................ 210/321.89 |
| 5,480,553 | 1/1996 | Yamamuri et al. ............. 139/383 R X |

OTHER PUBLICATIONS

World Patents Database.
U.S. Patents Database.

*Primary Examiner*—Andy Falik
*Attorney, Agent, or Firm*—Townsend and Townsend and Crew LLP

[57] ABSTRACT

Hollow fiber membrane modules are manufactured by weaving hollow fiber membranes into a web while the fibers still contain a residual amount of the organic liquids used in the extrusion of the fibers. The web once formed is then passed through a final solvent extraction stage, followed by drying and heating to fix the final form and permeation characteristics of the membranes, and finally rolling the web into a bundle which forms the interior of the module. The hollow fibers are woven as fill in the web.

25 Claims, 2 Drawing Sheets

LOOM PROCESSING OF HOLLOW FIBER MEMBRANES

BACKGROUND OF THE INVENTION

Membranes for the separation of gas mixtures by selective permeability have been in commercial use for a considerable period of time. A common form of such a membrane is a hollow hair-like fiber, with a bundle of such fibers, numbering as many as several hundred thousand to well over a million, joined together into a single unit where the fibers are arranged in parallel. The units are shaped as cylindrical modules, with the fibers arranged parallel to the cylinder axis and both ends of the fibers embedded in tubesheets formed from potting compounds. The tubesheets fix the positions of the fibers relative to each other and to the module casing, and direct the flow of incoming gas to the fiber lumens in modules designed for boreside feed, or to the fiber exteriors in modules designed for shellside feed, with the permeate being drawn from the shellside or boreside, respectively.

The formation of the fibers is a critical process, since the effectiveness of each fiber as a separation medium is determined not only by the polymer used but also by the liquid medium in which the polymer is dissolved for extrusion and the manner in which the liquid is removed subsequent to extrusion. Conventional manufacturing methods involve a liquid medium consisting of a mixture of two nonaqueous liquids, one of which is a solvent for the polymer and the other a non-solvent. Descriptions of such mixtures and their use are found in numerous patents, examples of which are Jensvold, J. A., et al., U.S. Pat. No. 5,141,530 (Aug. 25, 1992), and Sanders, Jr., E. G., et at., U.S. Pat. No. 4,955,993 (Sep. 11, 1990). Once the polymer has been extruded into fibers, a portion of each component of the liquid medium is removed by aqueous quench and leaching baths, which also serve to establish in a preliminary manner the pore structure of the fiber and hence its permeation qualities. The fibers are then wound onto spools or Leesona packages on which the final processing takes place before the fibers are ready for arrangement in bundles and placement in the module casing. This processing involves a prolonged aqueous extraction of the remaining solvent, followed by drying. The fully formed and dried fibers are then placed over a core tube where the fibers are layered to a depth sufficient to include the desired number of fibers and to fill the module casing. The tubesheets are applied either while the fibers are being placed over the core or afterward, and the collected fibers are then encased in the module housing. Descriptions of the application of the fibers to the core, the formation of the tubesheet and construction of the module in general are found in many patents, examples of which are Clark, G. B., U.S. Pat. No. 4,080,296 (Mar. 21, 1978), and Thibos, P. A., U.S. Pat. No. 4,824,566 (Apr. 25, 1989). Each of the patents listed in this paragraph are incorporated herein by reference.

The processing of fibers on spools presents certain difficulties. For example, the degree of exposure of any segment of the fiber to the surrounding environment will vary with the location of that segment in the spool. With many layers of fiber on a single spool, this can produce a lack of uniformity between the innermost and outermost fibers of the spool. To minimize or eliminate this risk, processing continues for an extended period of time, generally 24 hours or more. Furthermore, labor is required to handle the spools and to monitor the processing conditions, space is required to store spools waiting to be processed and spools already processed and waiting to be placed in modules, and a processing chamber is needed of sufficient size to accommodate a large number of spools. A further difficulty is that solvent removal and drying cause the fiber to shrink, and shrinkage on the spool results in pressure being exerted on the fiber segments occupying the innermost part of the spool winding. This crushes the segments, which creates a further source of nonuniformity, and a lowering of the effectiveness of the fiber bundle as a whole.

Placement of the fibers around the core tube is achieved by machinery which folds the fibers into lengths by wrapping them around monofilaments whose spacing corresponds approximately to the length of the fibers in the final module. The lengths are then placed around core tube. This machinery unfortunately consumes an excess of fiber, resulting in wastage of up to about 25% of the fiber. In addition, the fibers have a tendency to slip across the core during the procedure, which detracts from the uniformity of the packing density of the fibers in the finished module.

These and other difficulties are addressed by the present invention.

SUMMARY OF THE INVENTION

In accordance with this invention, hollow fiber membrane modules are prepared by weaving the fibers to form a woven web prior to the final processing stage of the fibers, then passing the web through an on-line processing station to remove most, if not all, of the residual liquid from the fibers and fix the intermolecular structure of the fiber walls, and wrapping the web thus processed around a core tube to form the module bundle. The fibers enter the weaving loom as filling threads and are weaved with warp threads. Continuous rolling of the resulting web over the module core tube thus places the fibers parallel to the core tube axis. It has been discovered that this continuous process achieves full treatment of the fibers with final fiber performance results at least equal to those obtained by the prior art processing on spools, and in a considerably shorter time. It has in fact been discovered that the continuous process of this invention produces modules having improved fiber performance overall, with a greater efficiency of gas separation. It has further been discovered that the formation of the woven web and its use in the formation of the module significantly reduces the amount of fiber wastage and labor required.

The process of the invention is a continuous flow process which includes weaving the web from hollow fiber membranes containing a portion of the nonaqueous solvent system in which the fibers were extruded, the portion amounting to less than about 5% by weight of the fibers, passing the web through an aqueous extraction bath to extract substantially all of the remaining nonaqueous liquid, drying the web, rolling the web into a bundle, and enclosing the bundle in a casing to form the module. A preferred range of solvent content is about 0.5% to about 5%, and a more preferred range is about 1% to about 2%. Extrusion of the hollow fiber membranes from a liquid solution of the polymer may be included in the continuous flow process, the extruded fibers passing through a solvent-removing stage to lower the solvent level to a level within the ranges indicated above, and then entering the weaving stage. The solvent-removing stage preferably includes an aqueous quench bath at a sub-ambient temperature and an aqueous leaching bath at a temperature above ambient. The fibers entering the weaving loom will then be saturated with water but will still contain the small amount of nonaqueous solvent indicated above. Alternatively, the hollow fiber membranes fed to the weaving stage can be drawn from spools of preformed fibers which have been prepared in the manner of the prior art without the final solvent removal stage of the prior art on the spools. The fibers drawn from the spools will thereby retain liquid, including the nonaqueous liquids in the quantities indicated above, and possibly water.

Weaving of the fibers on the loom permits the formation of a selvage along each of the two edges of the web, to stabilize the weave and to prepare the fiber ends for application of the tubesheets once rolled (or during rolling) into the bundle. The loom also permits the insertion of spacer strips or sheets between layers of the web as the web is rolled into the bundle. The insertion of one or more spacer strips asymmetrically relative to the centerline of the web permits the formation of a fiber module with a fiber packing density which is variable along the length of the module. Variation of the packing density is a useful means of controlling the direction of gas flow on the shell side of the fibers within the module, and of thereby optimizing the use of the fibers in separating the components of the incoming gas.

Further features and advantages of the invention will be apparent from the description which follows.

DETAILED DESCRIPTION OF THE INVENTION AND PREFERRED EMBODIMENTS

Figure 1:
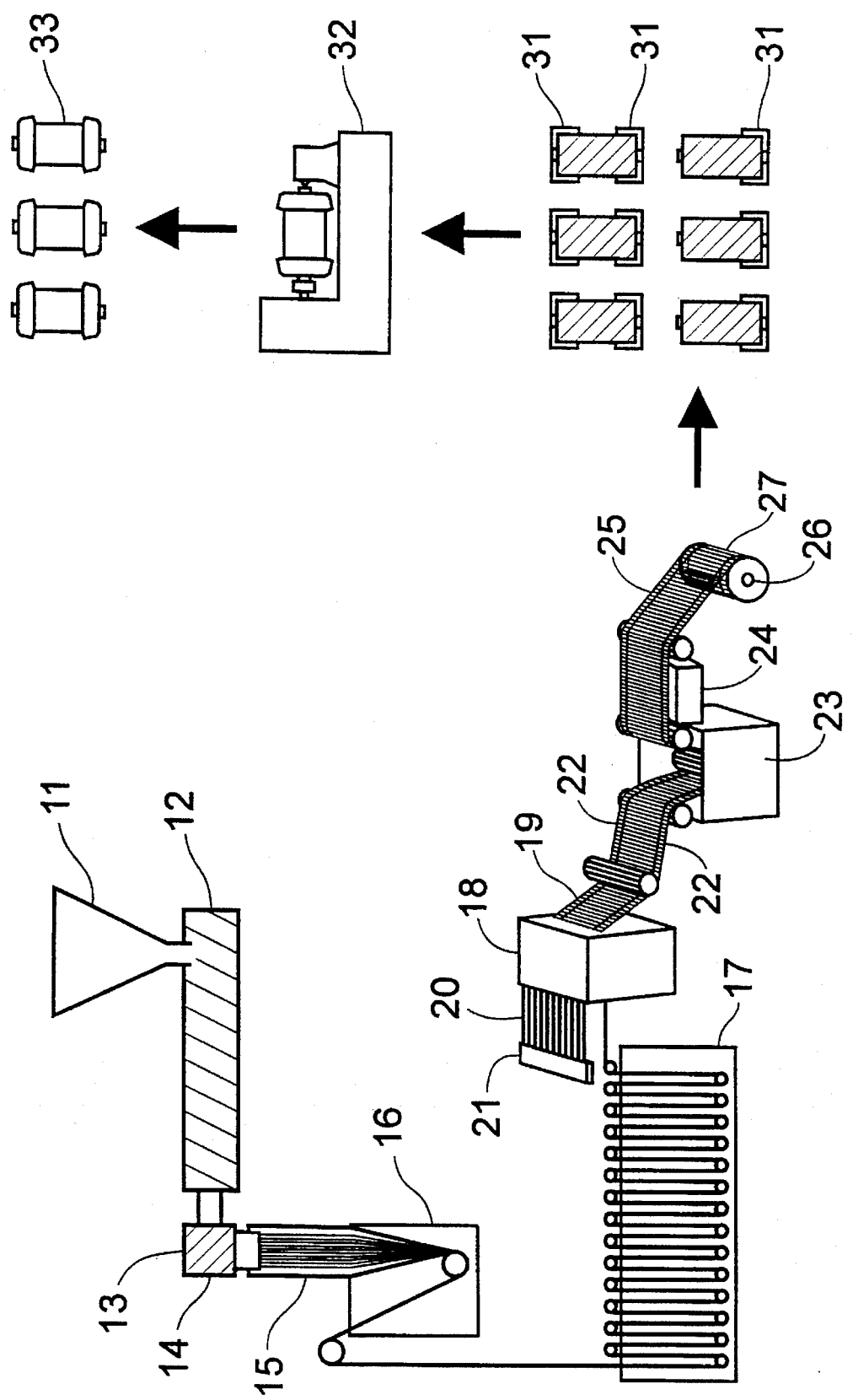
FIG. 1 is a schematic diagram of a continuous processing line in accordance with the present invention.

The weaving stage of the process of this invention can be any conventional machine-operated textile loom capable of weaving a continuous fabric. A flexible rapier loom is one example. The warp threads can be of any conventional thread material provided that it is strong enough to withstand the typical level of tension to be encountered by a conventional loom. The warp threads are preferably inert with respect to the gases which the module hollow fiber membranes will be used to separate, i.e., the warp threads displaying substantially no absorptivity, adsorptivity, or permeability, selective or otherwise, of the individual gases or gas mixture. Accordingly, these threads may be synthetic or made of natural materials. Examples are conventional polyester threads, particularly for the threads used in the central portion of the web. These threads are preferably textured to reduce or eliminate slippage of the hollow fiber membranes across the warp threads. The warp threads can also be used in bundles of 10, 20, 30 or more strands each for added strength.

The warp threads in the selvage can be fabricated from a different material than that used for the central portion threads, to serve any of the various purposes of these areas. For example, the thread material can be selected to prevent wicking (i.e., capillary action) of potting compound materials which are later applied over the selvage to form the tubesheets. This will improve control of the thickness and uniformity of the tubesheet and thereby maximize the active area of the fiber membranes. Polytetrafluoroethylene and its various analogs (TEFLON), silicone rubber or other non-wettable or low-wettability synthetic can be used as a thread material for this purpose. The entire thread may be formed from this material, or the material can be applied to the thread as a surface coating, using conventional techniques such as dipping or spraying.

The warp threads can be fed to the loom by a conventional creel, spin beam, or any type of frame or feeding mechanism which will control the spacing and tension of the warp threads. The spacing can be varied along the width of the web, preferably with a closer spacing in the selvage along each outer edge of the web, relative to the central portion of the web, which will contain the active portions of the hollow fiber membranes. The actual spacings of the warp threads are not critical in either the selvage strips or the central portion of the web, although the spacings will affect the density and integrity of the resulting weave. Preselection and control of the spacings are therefore desirable in helping to achieve the desired packing density in, and hence the maximum efficiency of, the final module. In most applications, typical warp thread spacings will be from about 0.1 cm to about 5.0 cm, preferably from about 0.5 cm to about 2.5 cm, in the central portion of the web, and from about 0.03 cm to about 0.3 cm, preferably from about 0.05 cm to about 0.1 cm, in the selvage. In one presently contemplated method, the central portion warp threads are arranged in bundles, spaced apart by about 0.5 inch (1.27 cm), and the selvage warp threads are likewise arranged in bundles, spaced apart by about 1/32 inch (0.079 cm).

In certain embodiments of the invention, it is desirable to vary the packing density of the fibers in the module. For modules designed for boreside feed, a monotonically increasing packing density in the direction from the inlet end of the module provides certain advantages, notably a more efficient use of the permeation characteristics of the fiber material. When the module is placed in use to separate a gas mixture, the incoming mixture, which will have the highest osmotic force due to its high partial pressure of the permeating gas, will thus enter the module at the region of lowest packing density. This region will offer the least resistance to the permeate passing through the membrane, and the increasing packing density in the direction of boreside flow will minimize the total pressure drop across the membranes. This type of variation can also serve to facilitate the countercurrent flow between bore side and shell side, countercurrent flow being favored for its contribution to the efficiency of the separation. The variation in packing density can be achieved by varying the spacing between the warp threads, the thickness of the warp threads, the number of individual filaments in the warp thread bundles, or the feed rate at which the warp threads are fed to the loom.

The width of the web will be selected to equal the length of the fibers in the module, including the total of both the active portions of the fibers and the portions embedded in the tubesheets. Typical web widths are at least about 100 cm, preferably at least about 150 cm. The width of the selvage is likewise a matter of choice, depending on the needs or dimensions of the loom, module and tubesheets. Typically, the selvages will each range from about 1 cm to about 20 cm in width, or preferably from about 2 cm to about 10 cm in width. One example of a specific web width presently contemplated is 86 inches (218 cm) in total width, with the selvages about 3 inches (7.6 cm) each in width or about 1 to 2 inches (2.54 to 5.08 cm) each in width.

The hollow fiber membranes, woven into the web as filling or tows, are also preferably woven as bundles. The number of threads in each bundle is not critical, and may vary depending on such considerations as strength and density. In most cases, the tow bundles will contain at least 20 fibers, preferably from 20 fibers to 150 fibers, most preferably from 30 fibers to 120 fibers. The spacing of these tows will determine the density of the fibers in the module, but is otherwise not critical. A typical spacing will be from about 0.05 cm to about 1.0 cm between tows, preferably from about 0.1 cm to about 0.5 cm. In one presently contemplated weave, the tows are bundles of 60 fibers each, with a 1/16-inch to 1/8-inch (0.16 cm to 0.32 cm) spacing between the tows. The tow fibers are cut as they enter the loom, resulting in a web with the hollow fibers being open at both ends.

The fiber tows are preferably fed to the loom under a tension sufficient for proper loom operation, but not so great as to risk breakage of or damage to the tows. While the actual tension can vary, in most cases the tension will be less than 100 grams per tow, and best results will be obtained with tensions ranging from about 40 grams to about 60 grams. The selected tension is maintained by conventional loom braking systems, including friction brakes, electronic brakes or both. The brakes may be stationary and applied in a continuous manner, or dynamic and applied only upon release of the tow, or a combination of both.

The type of weave is not critical, but a simple square weave will suffice and will be the most convenient for the central portion of the web. For the selvage, it is often advantageous to utilize a denser or more locking type of weave to provide the edges of the web with added stability and strength. Leno weaving, which is an open weave in which pairs of warp threads cross one another and thereby lock the filling fibers in position, is one type of weave useful for this purpose. The fiber ends can be further sealed into position in the selvage strips by thermal or ultrasonic sealers immediately downstream of the loom.

Weaving of the fiber membranes into the web is performed while the fibers contain a small residual amount of the organic solvent mixture in which the fibers were first extruded. As known in the prior art and discussed in more detail below, the permeability characteristics of the fibers are highly dependent on both the choice of liquids used to liquefy the polymer for the extrusion process and the manner in which these liquids are removed from the extrudate. The liquids are generally organic but water-miscible, permitting extraction by aqueous media. To produce fibers of maximum utility and efficiency, the aqueous extraction of the solvent mixture and the subsequent drying of the fibers are performed in stages, each at a controlled temperature and residence time. At the final stage of liquid removal, shrinkage of the fibers occurs. In accordance with the present invention, the final liquid removal stage is performed between the weaving stage and the rolling of the woven web over the core to form the interior of the module. This permits the weaving to be performed with wet fibers, thereby protecting the fibers from breakage, crushing or other physical damage which might be encountered on the loom. Any shrinkage then occurs subsequent to the formation of the web, and the weave serves to stabilize the fibers during the shrinkage. The dry and finished fibers are then loaded directly onto the core tube, thereby avoiding any intermediate impacts or handling which might damage the fibers.

The amounts of organic liquids and water remaining in the fibers as the fibers enter the loom are not critical and can be varied widely, provided that little or no shrinkage of the fibers has occurred due to solvent removal before reaching the loom. It is preferable that prior to entering the loom, the fibers will have been processed sufficiently to remove most of the organic liquid used in the extrusion, and preferably as much of the liquid as possible without significant shrinkage occurring. In most applications, the amount of organic liquids still present in the fibers entering the loom will constitute from about 1% to about 5% of the fibers by weight, preferably from about 1% to about 2%, and most often from about 1% to about 1.5%.

The organic liquids are removed from the fibers on the web emerging from the loom, by passing the web through an aqueous extraction bath. The temperature of the extract bath and the residence time of the web in the bath may vary, and are not critical provided that sufficient organic liquid is removed to prevent further shrinkage of the fibers to any significant degree once the fibers are encased in the module and in use. It will generally be sufficient to lower the organic liquid content to less than about 0.5% by weight of the fibers, and preferably less than about 0.2% by weight. In particularly preferred operation, the organic liquid content will be lowered to about 0.1% by weight or less. In most operations, best results will be obtained with an extraction bath operating at a temperature of about 85° C. or higher. Preferably, the temperature is within the range of about 85° C. to about 98° C., and most preferably from about 85° C. to about 95° C. The residence time will generally be at least about 3 minutes, and preferably from about 5 minutes to about 15 minutes. In one presently contemplated operation, the extraction bath is maintained at a temperature of about 90° C. and the web has a residence time of 6 to 8 minutes.

The water-saturated fibers emerging from the extraction bath can be dried in air or any inert atmosphere. Moving air at an elevated temperature is preferred, and a drying stage followed by a longer heat treatment to fix the polymer structure is particularly preferred. The drying and heat treatment can be performed by separate air streams, the drying for example by contact with air at a temperature in the range of 75° C. to 120° C. with a contact time of 3 to 5 minutes, and the heat treatment by contact with a separate air stream at a temperature in the range of 100° C. to 120° C. with a contact time of 12 to 20 minutes. As one specific example, drying can be performed in 75° C. air with a contact time of 5 minutes, followed by heat treatment in 100° C. air for 15 minutes.

The web thus woven, with solvents extracted from the fibers and the fibers thoroughly dried, is rolled over the core tube to form the large bundle of fibers which will collectively form the permeation medium of the module. (The term "bundle" as it is used in this paragraph refers to collection of fibers constituting the rolled web.) The roll layers can be separated at intervals by intermediate wraps of flexible sheet material. These wraps can provide further stabilization to the shape of the large bundle as it is being rolled, and they can also serve other purposes, such as controlling the packing density of the fibers and channelling the flow of gases on the shell side of the fibers to promote countercurrent flow between the tube side and the shell side. Depending on the purpose to be served, the wraps can be woven materials which are permeable to the gases being separated, or they can be impermeable materials. Examples of impermeable materials are MYLAR polyester film available from ICI Americas, Inc., Wilmington, Del., USA, and SARAN polyvinylidene chloride film available from the Dow Chemical Company, Midland, Mich., USA. The wraps can be arranged as concentric cylinders parallel to the core, intermittently interrupting the continuity of the rolled web interleaved between selected pairs of adjacent layers of the rolled web with each wrap limited to a single circumference of the module or, or rolled with the web as a continuously alternating layer across the entire bundle diameter. In certain preferred constructions, the wraps are arranged at intervals along the bundle diameter, the intervals measuring between about 1 cm to about 5 cm, preferably from about 2 cm to about 3 cm.

The thickness of each wrap or the spacing between the wraps can also be varied from one end of the bundle to the other to vary the packing density, as a further alternative to achieving a similar effect by varying the warp threads in the manner mentioned above.

The application of a tubesheet to each end of the rolled fiber web may be done to the rolled web either before or after the rolled web is encased in the module housing. As is well known in the art, the tubesheets hold the fibers in place and separate the module into an inlet region where the incoming gas mixture is introduced into the fibers, a separation region where one or more components of the gas mixture permeate the fiber walls on a preferential basis, and an outlet region in which the nonpermeated gas is collected for removal from the module.

The tubesheets are generally formed from thermoset or thermoplastic resin, creating a fluid-tight seal around the fibers, and are applied to the fibers in such a manner that the fiber bores are left open to allow entry or exit of the gas mixture. Tubesheets may also include resin-impregnated cloth.

Examples of resins useful for tubesheets are artificial and natural rubbers, epoxies, phenolaldehydes, acrylic resins, polysiloxanes, polyurethanes, and fluorocarbons. Epoxy resins are particularly preferred, prominent examples being glycidyl polyethers or polyhydric phenols. Polyhydric phenols suitable for use include both mononuclear phenols and polynuclear phenols, and included within the latter are the phenol-aldehyde condensation resins commonly known as novolac resins. Examples of mononuclear phenols are resorcinol, catechol, hydroquinone, and phloroglucinol. Examples of polynuclear phenols are 2,2-bis(4-hydroxyphenyl)propane (bisphenol A), 4,4'-dihydroxybenzophenone, 1,1-bis(4-hydroxyphenyl)ethane, bis(2-hydroxynaphthyl)methane, 2,2-bis(4-hydroxyphenyl)butane, and 4,4'-(dihydroxyphenyl)phenylsulfone. Preferred epoxy resins are diglycidyl ethers of bisphenol A.

The epoxy resin is cured with a conventional curing agent. Examples are polyfunctional amines such a aromatic diamines or mixtures or adducts thereof, and 2,4-dialkylimidazoles. Other useful amines are m-phenylenediamine, methylenediamine, mixtures and adducts of the two, diaminodiphenylsulfone, and 4-chlorophenylene diamine.

A curing catalyst can also be included in the tubesheet composition. Typical curing catalysts for epoxy resins are tertiary amines such as benzyldimethylamine, N,N,N',N'-tetramethylbutanediamine, dimethylaminopropylamine, N-methylmorpholine, and N-triethylenediamine.

The tubesheet can be applied by a dip potting method, in which the selvage ends of the fully rolled web are dipped into the uncured liquid tubesheet mixture. Alternative means of applying the tubesheet mixture are by dripping the tubesheet at controlled rates over the selvage ends of the web as the web is being rolled. The latter method offers the advantage of permitting one tubesheet to be formed with a greater amount of resin, and hence a greater spacing between the fibers, than the other. These methods are generally known in the art.

The final encasement of the rolled fiber web in a housing to form the module is accomplished by conventional methods as used for modules of the prior art. The casing is generally a pressure vessel in the form of a cylindrical tube sealed at both ends with end caps and containing appropriately placed ports for inlet of the incoming gas mixture and for outlets for both the permeate and the nonpermeated gas. The casing protects the fiber membranes, channels the flows, and together with the tubesheet, defines the interior regions of the module. The tubesheets are sealed to the casing, using O-rings and grooves, or any other type of conventional fluid-tight sealing means. Typical materials for the casing are plastics, plastic composites, aluminum, and steel. The casing is enclosed around the fibers by either using a two-piece clamshell-type casing or a single-piece casing in which the fibers are introduced at one end, followed by the securing of the end caps. Sealing of the casing is accomplished by welding, bolts, adhesives, or any other conventional means.

With the tubesheet sealed to the casing, the curvature of the tubesheet surface will conform to that of the casing wall. The tubesheet and hence the casing wall can have the contour of either a straight cylinder or a tapered cylinder.

Tapered tubesheets offer an advantage for a module run under a large pressure differential between the inlet or outlet regions and the separation region of the module. For bore-side feed modules, the taper will be an inward taper, such that the tubesheet diameter will decrease from the outer end of the module toward the center of the module. This will be true of both tubesheets, with the contacting surfaces of the casing wall tapered similarly. At the inlet end of the module, the pressure in the inlet region (on the inlet side of the tubesheet) will be higher by as much as 200 psi than the pressure in the separation region of the module at the shell side of the fibers. Upon prolonged use of the module, this pressure differential will tend to deform the casing around the tubesheet (since the casing is generally softer than the tubesheet), causing the casing to separate from the tubesheet. The taper prevents this separation from occurring by ensuring that the tubesheet remains tightly sealed against the casing wall despite the deformation. Leakage across or around the tubesheet into the shell side is thus prevented, as is bypass of the fibers by the incoming gas mixture. At the outlet end of the module, the pressure at the outlet side of the tubesheet will also be higher by as much as 200 psi than the pressure at the shell side of the separation region, since the pressure across the fiber walls themselves decreases only slightly along the length of the module. Thus, the same deformation of the casing can occur upon prolonged use of the module, and here also the taper in the tubesheet and casing will prevent separation of the tubesheet from the casing.

The hollow fiber membranes being fed to the loom may be drawn from spools, having been wound onto the spools from a separate extrusion and winding unit which is not included in the continuous-flow system which includes the loom, the extraction and drying stations and the rolling of the web onto the module core tube. The fibers on these spools can be prepared in accordance with the prior art methods, including extrusion of a solution of the polymer, quenching the extrudate by immersion in a quench bath, then leaching solvent from the quenched extrudate to achieve fibers containing residual solvent in the weight percent ranges recited above. Thus, the final processing of spooled fibers of the prior art, i.e., the prolonged soak of the spools in hot water and the drying of the spools, is eliminated and replaced by final processing on the web.

Alternatively, the fibers can be extruded as part of the continuous flow process itself. Conventional extrusion equipment can be used, and the extruded fiber can be gathered in filament bundles of ten or more filaments as indicated above and processed in these bundles. (In this and subsequent paragraphs referring to stages upstream of the loom, the term "bundles" is used to refer to the filament combinations which will serve as tows in the loom, as opposed to the larger bundles formed by rolling the woven web.)

Once extruded and gathered, the bundles can then be passed through an aqueous quenching bath to begin the phase separation, i.e., the initiation of the formation of the pore structure of the membrane, and also to begin extraction of the solvent. This initial treatment stage is performed at a temperature of about 20° C. or below, preferably about 1° C. to about 10° C., and most preferably from about 2° C. to about 5° C. A typical residence time would be from about 1 second to about 10 seconds, or preferably from about 2 seconds to about 3 seconds. Under these conditions, the amount of organic liquid extracted from the polymer is from about one-third to about one-half of the amount originally present. The aqueous quench bath is preferably a water bath from which water is continuously drawn off and replaced with fresh water to maintain the level of organic components in the water below about 3%. In a specific example where the organic components were a combination of N-methyl pyrrolidone (NMP) and triethylene glycol (TEG), as discussed in more detail below, the NMP level is preferably maintained below 0.5% by weight, and the TEG level below about 0.25% by weight.

Fibers emerging from the quench bath are preferably passed through a hot water leaching bath. In addition to removing further amounts of organics from the fibers before the fibers reach the loom, the leaching treatment further defines the structure of the membrane by coalescing the pores. The temperature is preferably in the range of about 60° C. to about 85° C., and more preferably from about 75° C. to about 83° C. A typical residence time is from about 10 seconds to about 60 seconds, preferably from about 15 seconds to about 45 seconds. In a specific implementation of the NMP/TEG example of the preceding paragraph, the leaching bath is maintained at a temperature of about 80° C. with a residence time of 15 to 45 seconds.

The present invention is useful in the manufacture of gas separation modules for the separation of a variety of gas mixtures. The invention is of particular interest, however, in the separation of air into oxygen and nitrogen. Membranes and membrane systems for this type of separation are well known and widely varied. Any such systems will be suitable for use in the present invention. Examples of the various polymers from which these membranes are made are polyimides, copolyimides, polyamides, polyacrylates, poly-4-methyl-1-pentene, polytrimethylsilylpropyne, asymmetric polysulfones, bis A-polysulfones, and bisphenol polycarbonates. These polymers and the membranes formed from them are commercially available from such suppliers as Air Products and Chemicals, Inc., Allentown, Pa., USA; Permea, Inc., St. Louis, Mo., USA; Union Carbide Industrial Gases Technology Corporation, Danbury, Conn., USA; E. I. duPont de Nemours & Company, Wilmington, Del., USA; Ube Industries, Ltd., Yamaguchi, Japan; and The Dow Chemical Company, Midland, Mich., USA.

Preferred membrane materials are bisphenol polycarbonates, particularly those represented by the following formula

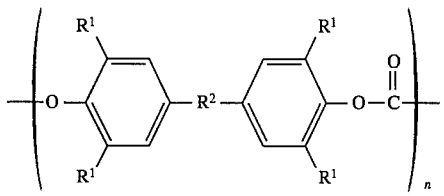

The $R^1$ groups in this formula are either the same or different within any single bisphenol subunit (the bracketed portion of the formula) and similarly either the same or different among different bisphenol subunits in a single polymeric chain or among different polymeric chains. Likewise, the $R^2$ units are either the same or different among different bisphenol subunits in a single polymeric chain or among different polymeric chains. The $R^1$ groups are defined as H, Cl, Br, or $C_1$-$C_4$ alkyl. The $R^2$ groups are defined as carbonyl (—C(O)—), thio (—S—), sulfonyl (—SO$_2$—), oxy (—O—), a $C_1$-$C_6$ divalent hydrocarbon radical, a $C_1$-$C_6$ divalent halo-substituted hydrocarbon radical, or an inertly substituted $C_1$-$C_6$ divalent hydrocarbon radical. Within these definitions, "halo-substituted" is preferably fluoro-, chloro- or bromo-substituted, and "inertly substituted" is preferably ($C_1$-$C_3$ alkoxy)-substituted, ($C_1$-$C_3$ alkylthio)-substituted, or hydroxy-substituted. The index n is a positive integer such that the polymer has sufficient molecular weight to prepare a membrane with suitable characteristics as a gas separation membrane. In preferred polymers of this formula, the number average molecular weight is about 50,000 or greater, more preferably about 100,000 or greater, and most preferably within the range of about 100,000 to about 300,000. In terms of the value of n, preferred polymers are those in which n has a number average of 50 or greater, more preferably 100 or greater, and most preferably within the range of 100 to 1,000.

It is further preferred that at least 25 weight percent of the bisphenol subunits in the polymer as a whole bear $R^1$ groups which are exclusively Br, Cl or mixtures of Br and Cl. More preferably, this proportion is at least 35 weight percent, still more preferably at least 50 weight percent, still more preferably at least 75 weight percent, and most preferably 100%. For polymers prepared from tetrachlorobisphenols or tetrabromobisphenols, it is preferred that the $R^1$ groups are all Cl or all Br, respectively, in at least about 90 weight percent of the bisphenol subunits, more preferably in at least about 95 weight percent, and most preferably in substantially all of the bisphenol subunits. Polymers prepared from tetrabromobisphenols are the most preferred. When $R^1$ groups which are not halogens are included, preferred such groups are H and methyl.

Preferred groups for $R^2$ are $C_1$-$C_6$ divalent hydrocarbon radicals, particularly $C_1$-$C_6$ alkylidene (saturated hydrocarbon) radicals, with isopropylidene (—C(CH$_3$)$_2$—) the most preferred.

Preferred bisphenol subunits within the formula are those prepared from the following bisphenols: 2,2-bis(3,5-bromo-4-hydroxyphenyl)propane and 2,2-bis(3,5-chloro-4-hydroxyphenyl)propane. Of these, 2,2-bis(3,5-bromo-4-hydroxyphenyl)propane is the most preferred.

The preparation of bisphenol polycarbonates is known in the polymer industry. Any of several conventional processes may be used.

One method of preparation is the direct reaction between phosgene and a bisphenol appropriately substituted with the substituents of the desired polymer product. The reaction is conducted in solution with a solvent such as methylene chloride and an acid acceptor such as pyridine. The resulting polymer is recovered as an organic solution after multiple aqueous washes to remove excess acid acceptor and the reaction by-product which is the hydrochloride of the acid acceptor. A modified version of this method is one in which the bisphenol and 1–3 mole percent of the corresponding monofunctional phenol are dissolved or slurried in aqueous sodium hydroxide. The organic solvent and a catalytic quantity of a tertiary amine are then added, and phosgene gas is added while the mixture is rapidly stirred. Upon completion of the reaction, the phases are separated and the polymer solution is washed with water and extracted with acid to remove the catalyst.

The polymer can also be prepared by transesterification, whereby phosgene is reacted with an appropriately substituted phenol to produce the corresponding diphenyl carbonate by passing the phosgene through an aqueous caustic solution of the phenol or by using a two-phase reaction medium as in the modified version of the direct reaction method. In either case, the crude diphenyl carbonate is purified by extraction with dilute base to hydrolyze and remove residual phenyl chloroformates, followed by distillation. Polymerization is then performed by combining the diphenyl carbonate with an appropriately substituted bisphenol in the presence of a basic catalyst such as calcium acetate or sodium, potassium or lithium carbonate under appropriate polymerization conditions.

Polymer resulting from either of these manufacturing methods is formed into hollow fiber membranes by extrusion methods known in the art. Typically, the polymer is combined with a liquid solvent and a liquid non-solvent to form a mixture, which is then heated to form a homogeneous extrudable fluid. The fluid is then extruded into the hollow fibers as discussed above, and the extrudate is passed through the quench bath to cool the extrudate and to remove a portion of the solvent and non-solvent, followed by the leaching bath to remove more solvent and non-solvent. Liquids useful as solvents include glycol ethers, dialkyl ketones, substituted morpholines, pyrrolidinones and substituted benzenes. A particularly preferred solvent, as mentioned above, is N-methylpyrrolidone (NMP). The non-solvent is a liquid which does not dissolve the polymer to any significant degree at extrusion temperatures and which thereby aids in the formation of the pores in the finished polymer. Liquids useful as non-solvents include glycols and glycol ethers, esters, alkanols, cyclohexanes, alkanes, dialkyl ketones, amides, nitriles and aldehydes. Particularly preferred non-solvents are triethylene glycol (TEG) and polyethylene glycols (PEGs) with molecular weights up to about 400. The spin composition (extrusion mixture) generally contains from about 30% to about 60% by weight, preferably from about 50% to about 55% by weight, of the polymer. The weight ratio of solvent to nonsolvent is preferably between about 2.0 and about 2.4. Methylene chloride is frequently included as a further solubilizing agent.

While the fiber shape is imparted to the membrane in the extrusion stage, the fiber is prevented from collapsing in subsequent stages by passing a core fluid through the hollow core of the fiber. The core fluid is generally a gas such as air, nitrogen or argon, and is applied at a pressure of about 0.1 to about 0.5 inches of water.

The hollow fibers used in this invention are preferably those having an outside diameter of about 50 microns to about 400 microns, more preferably about 75 microns to about 250 microns. The outer-to-inner diameter ratio is preferably between about 1.15 and about 2.5, more preferably between about 1.25 and about 1.70. The separation factor for oxygen and nitrogen at 30° C. is preferably about 3.0 or greater, most preferably about 5.0 or greater, with about 7.0 particularly preferred. The gas permeability for oxygen is preferably at least about 0.5 Barrers, most preferably at least about 4.0 Barrers. Preferred membranes also have a flux of about $3.0 \times 10^{-6}$ sec/cm$^2$-(cm Hg)-sec or greater, more preferably about $8.0 \times 10^{-6}$ sec/cm$^2$-(cm Hg)-sec or greater, still more preferably at least about $10.0 \times 10^{-6}$ sec/cm$^2$-(cm Hg)-sec or greater, still more preferably at least about $15.0 \times 10^{-6}$ sec/cm$^2$-(cm Hg)-sec or greater, and most preferably within the range of about $15.0 \times 10^{-6}$ to about $100.0 \times 10^{-6}$ sec/cm$^2$-(cm Hg)-sec.

The drawings will now be described in detail. FIG. 1 depicts the process of this invention as a continuous flow process incorporating all stages from the fiber extrusion through the rolling of the woven fibers to form the interior of the module, followed by further manufacturing steps to form the finished module. It must be understood that this drawing depicts only one example of how the invention can be implemented.

The preformed polymer in pellet form is fed from a hopper 11 to a twin screw extruder 12, where it is combined with the liquid organic solvent and liquid organic non-solvent mixture to form a homogeneous liquid solution for extrusion. The solution is fed by a metering pump 13 to a 30-hole spinneret 14 which extrudes the solution into a 30-fiber bundle. The extrudate bundle passes through a shroud 15 into a cold water quench bath 16 at the preferred temperature and residence time indicated above. Upon emergence from the quench bath, the fiber bundle passes through a warm water leach bath 17, again at the preferred temperature and residence time indicated above.

The fiber bundle emerging from the leach bath is then passed to a flexible rapier loom 18 where the fibers are woven in the fill direction into a web 19, with warp threads 20 supplied separately from a creel 21. The weaving process also forms selvage strips 22 along each edge of the web. The web passes into a hot water solvent extraction bath 23, operating at the preferred temperature and residence time indicated above and from there into an air drying and heat treatment stage 24. The finished web 25 is then rolled onto a core tube 26 to form the large fiber roll 27 which will form the interior of the module.

Once the roll 27 has reached its full diameter, it is removed from the production line and both ends are dipped in tubesheet potting compound 31. The tubesheet material is cured, and its outer ends machined 32 to expose the open ends of the fibers. The fibers and tubesheets are then encased in the module casings to form the finished modules 33.

Figure 2A:
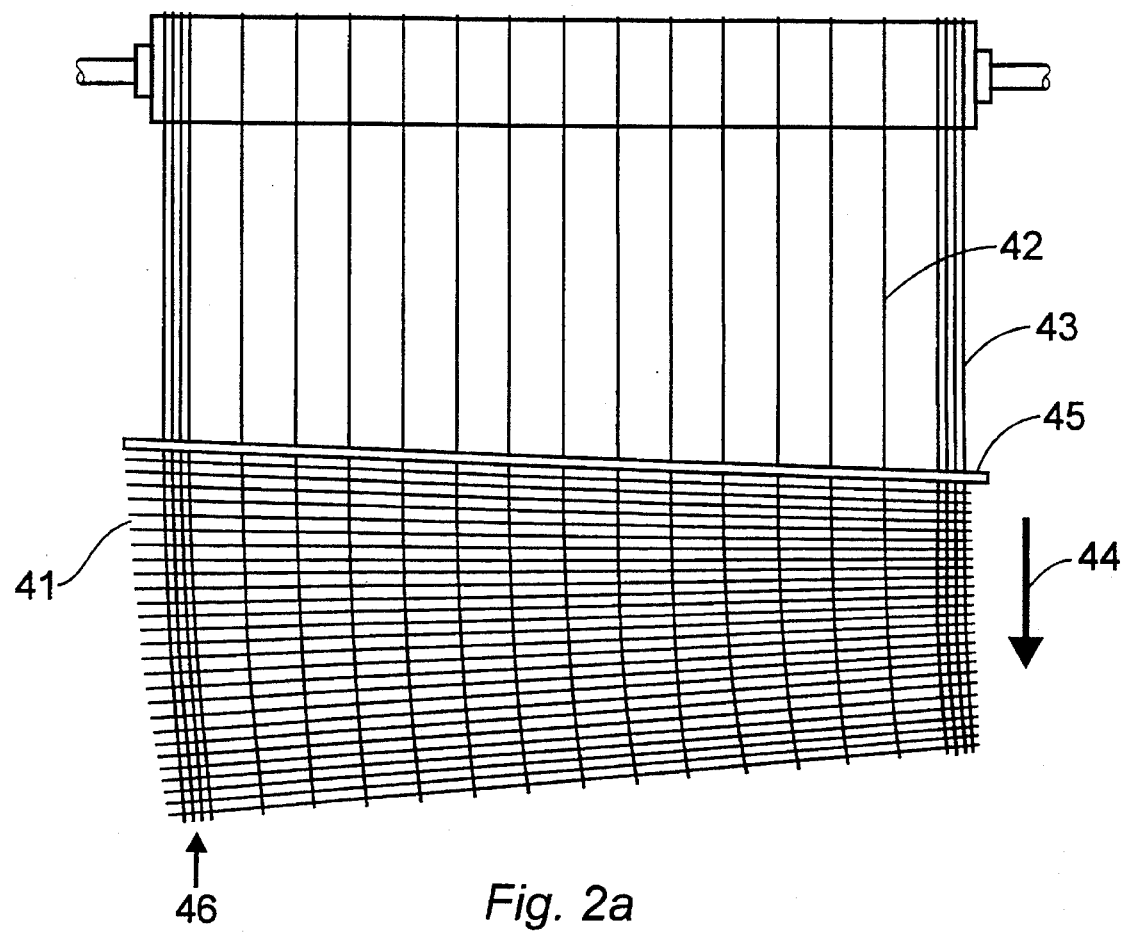
FIG. 2a is an upper view of the fibers being woven into a web on a loom in accordance with one embodiment of the invention in which the fiber bundle is formed with a variable packing density.
Figure 2B:
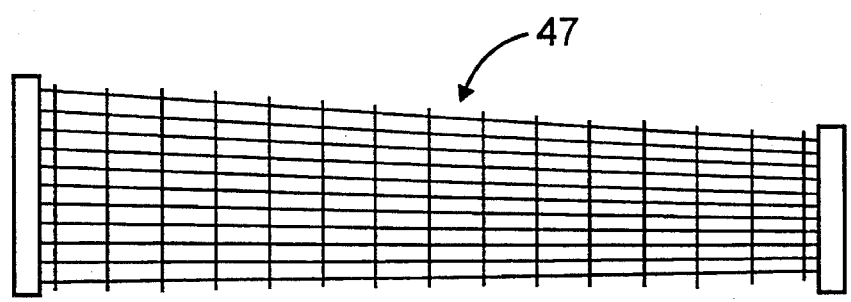
FIG. 2b is a transverse view of a tapered fiber bundle prior to being enclosed in a module casing.

FIGS. 2a and 2b depict the formation of a tapered fiber bundle. In FIG. 2a, the view is from above the loom, showing the fiber tows 41 being woven in the fill direction, the warp threads 42, and the more closely spaced selvage threads 43. The direction of movement of the warp threads and the emerging web are indicated by the arrow 44. The loom heddle 45 is inclined to result in a faster feed of warp threads on the left side 46 of the web relative to the right, and a continuous increase in the closeness of the fiber tows to each other from left to right. FIG. 2b depicts the roll 47 formed by rolling the web over the core tube, and the roll is tapered, with the wider end at the left. The fiber packing density accordingly increased from left to right.

The following example is offered for purposes of illustration, and is not intended to limit the invention in any manner.

EXAMPLE

This example illustrates the use of gas separation modules manufactured in accordance with the present invention, which will be referred to as "loom units," and compares these with modules prepared with approximately the same number of fibers of the same size and composition but using the prior art method of placing individual fibers directly on the core tube, and which will be referred to as "conventionally fabricated units."

The fibers used were bisphenol polycarbonates formed from 2,2-bis(3,5-bromo-4-hydroxyphenyl)propane, and the gas separated was air. The active (permeation) length each fiber was 58 inches (147 cm), and the units contained between 402,000 and 403,000 fibers each. The fibers had outer diameters of 135 microns and inner diameters of 95 microns. The experiment was conducted with 57 conventionally fabricated units and 69 loom units, the loom units having been fabricated on the production line depicted in the drawing, using the conditions indicated above as the most contemplated at present. Two inlet pressures were used, 135 psig ($9.31 \times 10^5$ pascals above atmospheric) and 60 psig ($4.12 \times 10^5$ pascals above atmospheric), and the outlet pressure was adjusted and maintained to achieve 99% (volume basis) nitrogen in the product gas, as determined by continuous sampling. All temperatures were maintained at 25° C.

The results in terms of the product gas flow rate and the recovery of the product gas (volume of product gas divided by volume of feed gas×100) are shown in the table below, which lists values averaged over all units in each group. Note that full "recovery" would be 79%.

| COMPARATIVE AIR SEPARATIONS | | | | |
|---|---|---|---|---|
| | Inlet Pressure: | | | |
| | 135 PSIG | | 60 PSIG | |
| | Average Flow Rate (SCFH) | Average Recovery (%) | Average Flow Rate (SCFH) | Average Recovery (%) |
| Conventionally Fabricated Units [57 Units, 403,000 fibers each 58 inches per fiber] | 270 | 33 | 76 | 25 |
| Loom Units [69 Units, 402,000 fibers each 58 inches per fiber] | 306 | 33 | 96 | 27.5 |

These test results show that at standard test conditions of 25° C. and 135 psig, the loom units produce 13% more product gas (306 SCFH vs. 270 SCFH) of 99% nitrogen relative to the conventionally fabricated units. At the lower operating pressure of 60 psig, where the impact of shell-side flow distribution is greater, the loom units provide an increase in product flow rate of 26% (96 SCFH vs. 76 SCFH) and an increase in recovery of 10% (27.5% vs. 25%).

The foregoing is offered primarily for purposes of illustration. It will be readily apparent to those skilled in the art that the operating conditions, materials, procedural steps and other parameters of the system described herein may be further modified or substituted in various ways without departing from the spirit and scope of the invention.

We claim:

1. A continuous flow method for forming a hollow fiber membrane module, comprising:
   (a) feeding hollow fiber membranes containing from about 1% to about 5% nonaqueous but water-miscible solvent by weight to a loom and weaving the hollow fiber membranes on the loom as filling with warp threads to form a web of woven fiber membranes;
   (b) passing the web through an aqueous extraction bath to lower the nonaqueous solvent content in the hollow fiber membranes to less than about 0.5% by weight, and drying the web upon emergence from the bath to remove all liquid; and
   (c) rolling the web thus dried into a bundle and enclosing the bundle in a casing containing boreside and shellside ports to form a hollow fiber membrane module;

steps (a) through (c) being performed in continuous flow.

2. A method in accordance with claim 1 further comprising the additional step of:
   forming a solution of fiber polymer material dissolved in a nonaqueous but water-miscible solvent, extruding the solution into hollow extrudates, and removing solvent from the hollow extrudates to form the hollow fiber membranes containing less than about 5% nonaqueous solvent by weight,
   the additional step being performed prior to step (a) and in continuous flow with steps (a) through (c).

3. A method in accordance with claim 1 further comprising drawing the hollow fiber membranes for feeding to the loom in step (a) from a spool, prior to step (a) and in continuous flow with steps (a) through (c).

4. A method in accordance with claim 1 in which the hollow fiber membranes fed to the loom in step (a) contain from about 1% to about 2% nonaqueous solvent by weight, and step (b) comprises lowering the nonaqueous solvent content to less than about 0.2% by weight.

5. A method in accordance with claim 1 in which the aqueous extraction bath is at a temperature of at least about 85° C.

6. A method in accordance with claim 1 in which the aqueous extraction bath is at a temperature of from about 85° C. to about 98° C. and step (b) has a residence time in the aqueous extraction bath of at least about 3 minutes.

7. A method in accordance with claim 1 in which the aqueous extraction bath is at a temperature of from about 85° C. to about 95° C. and step (b) has a residence time in the aqueous extraction bath of from about 5 minutes to about 15 minutes.

8. A method in accordance with claim 2 in which the additional step further comprises:
   (i) quenching the hollow extrudates immediately after extrusion in an aqueous quenching bath at a temperature below about 20° C.; and
   (ii) leaching nonaqueous solvent from the hollow extrudates thus quenched, in an aqueous leaching bath at a temperature of at least about 60° C.

9. A method in accordance with claim 8 in which the aqueous quenching bath is at a temperature of from about 1° C. to about 10° C., and step (i) has a residence time in the aqueous quenching bath of from about 1 second to about 10 seconds.

10. A method in accordance with claim 8 in which the aqueous quenching bath is at a temperature of from about 2° C. to about 5° C., and step (i) has a residence time in the aqueous quenching bath of from about 2 seconds to about 3 seconds.

11. A method in accordance with claim 8 in which the aqueous leaching bath is at a temperature of from about 60° C. to about 85° C., and step (i) has a residence time in the aqueous leaching bath of from about 10 seconds to about 60 seconds.

12. A method in accordance with claim 8 in which the aqueous leaching bath is at a temperature of from about 75° C. to about 83° C., and step (i) has a residence time in the aqueous leaching bath of from about 15 seconds to about 45 seconds.

13. A method in accordance with claim 2 in which the additional step further comprises:

(i) quenching the hollow extrudates immediately after extrusion in an aqueous quenching bath at a temperature of from about 2° C. to about 5° C. for about 2 seconds to about 3 seconds; and (ii) leaching nonaqueous solvent from the hollow extrudates thus quenched, in an aqueous leaching bath at a temperature of from about 75° C. to about 83° C.;

and the aqueous extraction bath is at a temperature of from about 85° C. to about 95° C. and step (b) has a residence time in the aqueous extraction bath of from about 5 minutes to about 15 minutes.

14. A method in accordance with claim 1 in which the warp threads are comprised of central warp threads and selvage threads, the selvage threads forming a selvage strip at each edge of the web, the selvage threads being substantially closer to each other than the central warp threads.

15. A method in accordance with claim 14 in which the selvage threads are woven into the web by leno weaving.

16. A method in accordance with claim 14 in which the web is at least about 100 cm in width, and the selvage strips are each from about 1 cm to about 20 cm in width.

17. A method in accordance with claim 14 in which the web is at least about 150 cm in width, and the selvage strips are each from about 2 cm to about 10 cm in width.

18. A method in accordance with claim 14 in which the selvage threads have surfaces of reduced wettability relative to the central warp threads.

19. A method in accordance with claim 1 in which step (a) comprises weaving the hollow fiber membranes as bundles of at least 20 fibers each.

20. A method in accordance with claim 1 in which step (a) comprises weaving the hollow fiber membranes as bundles of 20 to 150 fibers each.

21. A method in accordance with claim 1 in which the bundle of step (c) is formed with a longitudinal axis and a fiber packing density which increases along the longitudinal axis.

22. A method in accordance with claim 1 in which (a) comprises feeding the warp threads to the loom at a rate varying along the width of the web such that the bundle of step (c) has a varying fiber packing density.

23. A method in accordance with claim 1 in which drying the web in step (b) comprises exposing the web to heated air at a temperature of from about 75° C. to about 120° C.

24. A method in accordance with claim 1 further comprising heating the web at a temperature of from about 100° C. to about 120° C. between steps (b) and (c).

25. A method in accordance with claim 1 in which drying the web in step (b) comprises exposing the web to heated air at a temperature of from about 75° C. to about 120° C., and the method further comprises heating the web at a temperature of from about 100° C. to about 120° C. between steps (b) and (c).

* * * * *